United States Patent
Haskell et al.

(10) Patent No.: US 8,355,436 B2
(45) Date of Patent: *Jan. 15, 2013

(54) METHOD AND APPARATUS FOR CONTROL OF RATE-DISTORTION TRADEOFF BY MODE SELECTION IN VIDEO ENCODERS

(75) Inventors: Barin Geoffry Haskell, Mountain View, CA (US); Adriana Dumitras, Sunnyvale, CA (US); Atul Puri, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/795,650

(22) Filed: Jun. 7, 2010

(65) Prior Publication Data

US 2010/0329333 A1 Dec. 30, 2010

Related U.S. Application Data

(60) Division of application No. 11/344,591, filed on Jan. 30, 2006, now Pat. No. 7,822,118, which is a continuation of application No. 10/615,117, filed on Jul. 7, 2003, now Pat. No. 7,042,943.

(60) Provisional application No. 60/424,738, filed on Nov. 8, 2002.

(51) Int. Cl.
*H04B 1/66* (2006.01)

(52) U.S. Cl. ......... 375/240.03; 375/240.05; 375/240.07; 375/240.24; 375/240.26; 382/251; 382/239; 382/235; 382/232

(58) Field of Classification Search ............. 375/240.03, 375/240.05, 240.07, 240.24, 240.26; 382/251, 382/239, 235, 232
See application file for complete search history.

(56) References Cited

U.S. PATENT DOCUMENTS

| 5,337,049 A | 8/1994 | Shimoda |
| 5,416,604 A | 5/1995 | Park |
| 5,473,384 A | 12/1995 | Jayant et al. |
| 5,691,770 A * | 11/1997 | Keesman et al. ........ 375/240.04 |

(Continued)

FOREIGN PATENT DOCUMENTS

CN 1157079 8/1997

(Continued)

OTHER PUBLICATIONS

Updated portions of prosecution history of U.S. Appl. No. 11/344,591, Jun. 24, 2010, Haskell, Barin Geoffry, et al.

(Continued)

*Primary Examiner* — Shawn An
(74) *Attorney, Agent, or Firm* — Adeli & Tollen, LLP

(57) ABSTRACT

A Method And Apparatus For Control of Rate-Distortion Tradeoff by Mode Selection in Video Encoders is Disclosed. The system of the present invention first selects a distortion value D near a desired distortion value. Next, the system determines a quantizer value Q using the selected distortion value D. The system then calculates a Lagrange multiplier lambda using the quantizer value Q. Using the selected Lagrange multiplier lambda and quantizer value Q, the system begins encoding pixelblocks. If the system detects a potential buffer overflow, then the system will increase the Lagrange multiplier lambda. If the Lagrange multiplier lambda exceeds a maximum lambda threshold then the system will increase the quantizer value Q. If the system detects a potential buffer underflow, then the system will decrease the Lagrange multiplier lambda. If the Lagrange multiplier lambda falls below a minimum lambda threshold then the system will decrease the quantizer value Q.

20 Claims, 4 Drawing Sheets

U.S. PATENT DOCUMENTS

| | | | |
|---|---|---|---|
| 5,778,192 A * | 7/1998 | Schuster et al. | 709/247 |
| 5,790,131 A | 8/1998 | Liang et al. | |
| 5,790,695 A | 8/1998 | Suwa | |
| 5,801,779 A | 9/1998 | Uz et al. | |
| 5,872,598 A | 2/1999 | Legall et al. | |
| 5,923,376 A | 7/1999 | Pullen et al. | |
| 5,929,916 A | 7/1999 | Legall et al. | |
| 6,023,296 A | 2/2000 | Lee et al. | |
| 6,049,629 A | 4/2000 | Hirabayashi | |
| 6,101,276 A | 8/2000 | Adiletta et al. | |
| 6,111,991 A | 8/2000 | Ribas-Corbera et al. | |
| 6,148,107 A | 11/2000 | Ducloux | |
| 6,192,075 B1 | 2/2001 | Jeng | |
| 6,229,925 B1 | 5/2001 | Alexandre et al. | |
| 6,278,735 B1 | 8/2001 | Mohsenian | |
| 6,414,992 B1 * | 7/2002 | Sriram et al. | 375/240.13 |
| 6,490,320 B1 | 12/2002 | Vetro et al. | |
| 6,493,385 B1 | 12/2002 | Sekiguchi et al. | |
| 6,493,386 B1 | 12/2002 | Vetro et al. | |
| 6,574,279 B1 | 6/2003 | Vetro et al. | |
| 6,650,707 B2 | 11/2003 | Youn et al. | |
| 6,760,482 B1 | 7/2004 | Taubman | |
| 6,826,228 B1 | 11/2004 | Hui | |
| 6,856,699 B1 | 2/2005 | Olivieri | |
| 6,925,119 B2 | 8/2005 | Bartolucci et al. | |
| 6,975,680 B2 | 12/2005 | Demos | |
| 7,031,387 B2 | 4/2006 | Jeon | |
| 7,042,943 B2 * | 5/2006 | Haskell et al. | 375/240.03 |
| 7,072,397 B2 | 7/2006 | Sriram et al. | |
| 7,079,581 B2 | 7/2006 | Noh et al. | |
| 7,095,784 B2 | 8/2006 | Chang et al. | |
| 7,194,035 B2 | 3/2007 | Dumitras et al. | |
| 7,822,118 B2 | 10/2010 | Haskell et al. | |
| 2001/0000704 A1 | 5/2001 | Fert et al. | |
| 2001/0014121 A1 | 8/2001 | Kaye et al. | |
| 2003/0202580 A1 | 10/2003 | Noh et al. | |
| 2004/0096113 A1 | 5/2004 | Taima | |
| 2004/0114817 A1 | 6/2004 | Jayant et al. | |
| 2005/0169370 A1 | 8/2005 | Lee | |
| 2006/0013298 A1 | 1/2006 | Tong et al. | |
| 2007/0127579 A1 | 6/2007 | Dumitras et al. | |

FOREIGN PATENT DOCUMENTS

| | | |
|---|---|---|
| CN | 1157080 | 8/1997 |
| CN | 1176562 | 3/1998 |
| CN | 1292978 | 4/2001 |
| EP | 0 910 212 | 4/1999 |
| EP | 1 170 954 | 1/2002 |
| EP | 1 563 688 | 8/2005 |
| EP | 1 584 200 | 10/2005 |
| EP | 1762093 | 3/2007 |
| EP | 1 933 569 | 6/2008 |
| EP | 1 936 995 | 6/2008 |
| EP | 2271104 | 1/2011 |
| JP | 2003-299102 | 10/2003 |
| JP | 2004-166128 | 6/2004 |
| KR | 2001-0053002 | 6/2001 |
| KR | 0305941 | 9/2001 |
| KR | 2003-0082818 | 10/2003 |
| TW | 545066 | 8/2003 |
| WO | WO 96/34495 | 10/1996 |
| WO | WO 96/34496 | 10/1996 |
| WO | WO 99/66734 | 12/1999 |
| WO | WO 02/089489 | 11/2002 |
| WO | WO 2004/045218 | 5/2004 |
| WO | WO 2004/064414 | 7/2004 |
| WO | WO 2006/004605 | 1/2006 |

OTHER PUBLICATIONS

Updated portions of prosecution history of U.S. Appl. No. 11/671,463, Jan. 7, 2011, Dumitras, Adriana, et al.

Portions of prosecution history of U.S. Appl. No. 11/118,616, Feb. 7, 2011, Tong, Xin, et al.

Updated portions of prosecution history of EP03778014, Dec. 2, 2010 (mailing date), Apple Inc.

Amendment Under Article 19 for PCT/US2005/022616, May 12, 2006, Apple Inc.

Updated portions of prosecution history of U.S. Appl. No. 11/118,616, Oct. 14, 2011, Tong, Xin, et al.

Updated portions of prosecution history of EP08005751, Sep. 23, 2011 (mailing date), Apple Inc.

Updated portions of prosecution history of EP08005958, Oct. 12, 2011 (mailing date), Apple Inc.

Portions of prosecution history of EP05773224, May 31, 2011 (mailing date), Apple Inc.

Wiegand, Thomas, "Study of Final Committee Draft of Joint Video Specification (ITU-T Rec.H.264/ISO/IEC 14493-10 AVC)," Dec. 5-13, 2002, Awaji Island, Japan. (JVT-F100).

Portions of prosecution history of U.S. Appl. No. 10/615,117, Oct. 27, 2005, Haskell, Barin Geoffry, et al.

Portions of Prosecution History of U.S. Appl. No. 11/344,591, May 17, 2010, Haskell, Barin Geoffry, et al.

Portions of Prosecution History of U.S. Appl. No. 10/614,929, Oct. 26, 2006, Dumitras, Adriana, et al.

Portions of Prosecution History of U.S. Appl. No. 11/671,463, Nov. 3, 2010, Dumitras, Adriana, et al.

International Search Report for PCT/US2003/034659, Mar. 12, 2004 (mailing date), Apple Computer, Inc.

International Preliminary Examination Report for PCT/US2003/034659, Apr. 25, 2006 (completion date), Apple Computer, Inc.

Written Opinion for PCT/US2003/034659, Sep. 13, 2005 (mailing date), Apple Computer, Inc.

International Search Report and Written Opinion for PCT/US2004/000316, Oct. 1, 2004 (mailing date), Apple Computer, Inc.

International Preliminary Report on Patentability for PCT/US2004/000316, Jan. 17, 2007 (mailing date), Apple Computer, Inc.

International Search Report and Written Opinion for PCT/US2005/022616, Mar. 20, 2006 (mailing date), Apple Computer, Inc.

International Preliminary Report on Patentability for PCT/US2005/022616, Dec. 28, 2006 (issuance date), Apple Computer, Inc.

Portions of prosecution history of EP 03 77 8014.5, Jul. 6, 2010 (mailing date), Apple Inc.

Portions of prosecution history of EP 08 00 5751.6, Sep. 30, 2010 (mailing date), Apple Inc.

Portions of prosecution history of EP 04 70 0631.7, Dec. 2, 2010 (mailing date), Apple Inc.

Portions of prosecution history of EP 08 00 5958.7, Dec. 17, 2010 (mailing date), Apple Inc.

Aramvith, Supavadee, et al., "A rate-Control for Video Transport over Wireless Channels," IEEE Transactions on Circuits and Systems for Video Technology, May 2001, pp. 569-580, vol. 11, No. 5.

Author Unknown, "Advanced video coding for generic audiovisual services", May 2003, 282 pages, Geneva, Switzerland.

Author Unknown, "Information technology—coding of audio-visual objects—Part 10: Advanced video coding" Oct. 1, 2004, 280 pages.

Boroczky, Lilla, et al., "Joint Rate Control with Look-Ahead for Multi-Program Video Coding," IEEE Transactions on Circuits and Systems for Video Technology, Oct. 2000, pp. 1159-1163, vol. 10, No. 7.

Chen, Michael C., et al., "Rate-Distortion Optimal Motion Estimation Algorithms for Motion-Compensated Transform Video Coding," IEEE Transactions on Circuits and Systems for Video Technology, Apr. 1998, pp. 147-158, vol. 8, No. 2.

Chen, Zhibo, et al. "Fast Motion Estimation for JVT," ISO/IEC JTC1/SC29/WG11 and ITU-T SG16 Q.6, document JVT-G016, Mar. 7-14, 2003.

Cheng, Po-Yuen, et al., "Rate Control for an Embedded Wavelet Video Coder," IEEE Transactions on Circuits and Systems for Video Technology, Aug. 1997, vol. 7, No. 4, pp. 696-702.

Chiu, Yi-Jen, et al., "A software-Only Videocodec Using Pixelwise Conditional Differential Replenishment and Perceptual Enhancements," IEEE Transactions on Circuits and Systems for Video Technology, Apr. 1999, pp. 438-450, vol. 9, No. 3.

Choi, Jinho, et al., "A Stable Feedback Control of the Buffer State Using the Controlled Lagrange Multiplier Method," IEEE Transactions on Image Processing, Sep. 1, 1994, pp. 546-558, vol. 3 No. 5, IEEE Inc., New York, US.

Chou, Chun-Hsien, et al., "A Perceptually Tuned Subband Image Coder Based on the Measure of Just-Noticeable-Distortion Profile,"

IEEE Transactions on Circuits and Systems for Video Technology, Dec. 1995, pp. 467-476, vol. 5, No. 6.

De Vleeschouwer, Christophe, et al., "Algorithmic and Architectural Co-Design of a Motion-Estimation Engine for Low-Power Video Devices," IEEE Transactions on Circuits and Systems for Video Technology, Dec. 2002, pp. 1093-1105, vol. 12, No. 12.

Ding, Wei, "Joint Encoder and Channel Rate Control of VBR Video Over ATM Networks," IEEE Transactions on Circuits and Systems for Video Technology, Apr. 1997, pp. 266-278, vol. 7, No. 2.

Ding, Wei, et al., "Rate Control of MPEG Video Coding and Recoding by Rate-Quantization Modeling," IEEE Transactions on Circuits and Systems for Video Technology, Feb. 1996, pp. 12-20, vol. 6, No. 1.

Dufaux, Frederic, et al., "Efficient, Robust and Fast Global Motion Estimation for Video Coding," IEEE Transactions on Image Processing, Mar. 2000, pp. 497-501, vol. 9, No. 3.

Dumitras, Adriana, et al., "Enhancement of Direct Mode Selection in B Pictures for Bit Rate Reduction of Compressed Video Sequences," 2003 International Conference on Image Processing, Sep. 14, 2003, pp. 825-828, vol. 3, IEEE, United States.

Dumitras, Adriana, et al., "I/P/B Frame Type Decision by Collinearity of Displacements," in Proceedings of IEEE International Conference on Image Processing, Oct. 24-27, 2004. pp. 2769-2772, United States.

Fan, Kuo-Chin, et al., "An Active Scene Analysis-Based Approach for Pseudoconstant Bit-Rate Video Coding," IEEE Transactions on Circuits and Systems for Video Technology, Apr. 1998, pp. 159-170, vol. 8, No. 2.

Flierl, Markus, et al., "Generalized B Pictures and the Draft H.264/AVC Video-Compression Standard," IEEE Transactions on Circuits and Systems for Video Technology, Jul. 2003, pp. 587-597, vol. 13, No. 7.

Flierl, Markus, et al., "Rate-Constrained Multihypothesis Prediction for Motion-Compensated Video Compression," IEEE Transactions on Circuits and Systems for Video Technology, Nov. 2002, pp. 957-969, vol. 12, No. 11.

Gallant, Michael, et al., "An Efficient Computation-Constrained Block-Based Motion Estimation Algorithm for Low Bit Rate Video Coding," IEEE Transactions on Circuits and Systems for Video Technology, Dec. 1999, pp. 1816-1823, vol. 8, No. 12.

Girod, Bernd, "Rate-Constrained Motion Estimation," in Proceedings of SPIE Conference on Visual Communications and Image Processing, Sep. 29, 1994, pp. 1026-1034, vol. 2308, Chicago, IL, United States.

Gu, Xiaodong, et al., "Implementing Dynamic GOP in Video Encoding," in IEEE International Conference on Multimedia and Expo (ICME), Jul. 6-9, 2003, pp. 349-352, vol. 1, Baltimore, United States.

He, Zhihai, et al., "A Unified Rate-Distortion Analysis Framework for Transform Coding," IEEE Transactions on Circuits and Systems for Video Technology, Dec. 2001, pp. 1221-1236, vol. 11, No. 12.

He, Zhihai, et al., "Low-Delay Rate Control for DCT Video Coding via p-Domain Source Modeling," IEEE Transactions on Circuits and Systems for Video Technology, Aug. 2001, pp. 928-940, vol. 11, No. 8.

He, Zhihai, et al., "Optimum Bit Allocation and Accurate Rate Control for Video Coding via p-Domain Source Modeling," IEEE Transactions on Circuits and Systems for Video Technology, Oct. 2002, pp. 840-849, vol. 12, No. 10.

Hoang, Dzung T., et al., "Efficient Cost Measures for Motion Estimation at Low Bit Rates," IEEE Transactions on Circuits and Systems for Video Technology, Aug. 1998, pp. 488-500, vol. 8, No. 4.

Horowitz, Micheal, et al., "H.264/AVC Baseline Profile Decoder Complexity Analysis," IEEE Transactions on Circuits and Systems for Video Technology, Jul. 2003, pp. 704-716, vol. 13, No. 7.

Jagmohan, Ashish, et al., "MPEG-4 One-Pass VBR Rate Control for Digital Storage," IEEE Transactions on Circuits and Systems for Video Technology, May 2003, pp. 447-452, vol. 13, No. 5.

Jayant, Nikil, et al., "Signal Compression Based on Models of Human Perception," Proceedings for IEEE, Oct. 1993, pp. 1385-1422, vol. 81, No. 10.

Jeon, Byeong-Moon, et al., "Mode decision for B pictures in TML-5,"Jan. 9-12, 2001, pp. 1-3, No. VECG-L10.

Jozawa, Hirohisa, et al., "Two-Stage Motion Compensation Using Adaptive Global MC and Local Affine MC," IEEE Transactions on Circuits and Systems for Video Technology, Feb. 1997, pp. 75-85, vol. 7, No. 1.

Koenen, Rob, "Overview of the MPEG-4 Standard," in ISO/IEC JTC1/SC29/WG11 N4668, Mar. 2002, pp. 1-79.

Kossentini, Faouzi, et. al., "Predictive RD Optimized Motion Estimation for Very Low Bit-Rate Coding," IEEE Journal on Selected Areas in Communications, Dec. 1, 1997, pp. 1752-1763, vol. 15, No. 9, IEEE Inc., New York, US.

Lan, Austin Y., et al., "Scene-Context-Dependent Reference-Frame Placement for MPEG Video Coding," IEEE Transactions on Circuits and Systems for Video Technology, Apr. 1999, pp. 478-489, vol. 9, No. 3.

Lee, Hung-Ju, et al., "Scalable Rate Control for MPEG-4 Video," IEEE Transactions on Circuits and Systems for Video Technology, Sep. 2000, pp. 878-894, vol. 10, No. 6.

Lee, Jeong-Woo, et al., "Bit Allocation for MPEG-4 Video Coding with Spatio-Temporal Tradeoffs," IEEE Transactions on Circuits and Systems for Video Technology, Jun. 2003, pp. 488-502, vol. 13, No. 6.

Lee, Jungwoo, et al., "Rate-Distortion Optimized Frame Type Selection for MPEG Encoding," IEEE Transactions on Circuits and Systems for Video Technology, Jun. 1997, pp. 501-510, vol. 7, No. 3.

Lee, Jungwoo, et al., "Scene-Adaptive Motion Interpolation Structures Based on Temporal Masking in Human Visual Perception," Oct. 22, 1993, pp. 499-510, SPIE vol. 2094, Princeton University, United States.

Lee, Jungwoo, et al., "Temporally Adaptive Motion Interpolation Exploiting Temporal Masking in Visual Perception," Sep. 2004, pp. 513-526, vol. 3 No. 5, IEEE, United States.

Lee, Sanghoon, et al., "Foveated Video Compression with Optimal Rate Control," IEEE Transactions on Image Processing, Jul. 2001, pp. 977-992, vol. 10, No. 7.

Lee, Woo Yong, et al., "Fast Algorithm for Optimal Bit Allocation in a Rate-Distortion Sense," Electronics Letters, Sep. 26, 1996, pp. 1871-1873, vol. 32 No. 20, Stevenage, Herts, GB.

Leung, Kwong-Keung, et al., "Parallelization Methodology for Video Coding—An Implementation on the TMS32OC8O," IEEE Transactions on Circuits and Systems for Video Technology, Dec. 2000, pp. 1413-1425, vol. 10, No. 8.

Lin, Liang-Jin, et al., "Bit-Rate Control Using Piecewise Approximated Rate-Distortion Characteristics," IEEE Transactions on Circuits and Systems for Video Technology, Aug. 1998, pp. 446-459, vol. 8, No. 4.

Luthra, Ajay K., et al., "Introduction to the Special Issue on the H.264/AVC Video Coding Standard," IEEE Transactions on Circuits and Systems for Video Technology, Jul. 2003, pp. 557-559, vol. 13, No. 7.

Ortega, Antonio, et al. "Rate-Distortion Methods for Image and Video Compression," IEEE Signal Processing Magazine, Nov. 1998, pp. 23-50.

Ortega, Antonio, et al., "Optimal Trellis-Based Buffered Compression and Fast Approximation," IEEE Transactions on Image Processing, Jan. 1994, pp. 26-40, vol. 3, No. 1.

Pan, Feng, et al., "A Study of MPEG-4 Rate Control Scheme and Its Improvements," IEEE Transactions on Circuits and Systems for Video Technology, May 2003, pp. 440-446, vol. 13, No. 5.

Pao, Ming, et al., "Encoding Stored Video for Streaming Applications," IEEE Transactions on Circuits and Systems for Video Technology, Feb. 2001, pp. 199-209, vol. 11, No. 2.

Pickering, Mark R., et al., "A Perceptually Efficient VBR Rate Control Algorithm," IEEE Transactions on Image Processing, Sep. 1994, pp. 527-532, vol. 3, No. 5.

Puri, Atul, et al., "Motion-Compensated Video Coding with Adaptive Perceptual Quantization," IEEE Transactions on Circuits and Systems for Video Technology, Dec. 1991, pp. 351-361, vol. 1, No. 4.

Ribas-Corbera, Jordi, et al, "A Frame-Layer Bit Allocation for H.263+," IEEE Transactions on Circuits and Systems for Video Technology, Oct. 2000, pp. 1154-1158, vol. 10, No. 7.

Ribas-Corbera, Jordi, et al, "Rate Control in DCT Video Coding for Low-Delay Communications," IEEE Transactions on Circuits and Systems for Video Technology, Feb. 1999, pp. 172-185, vol. 9, No. 1.

Ronda, Jose I., et al., "Rate Control and Bit Allocation for MPEG-4," IEEE Transactions on Circuits and Systems for Video Technology, Dec. 1999, pp. 1243-1258, vol. 9, No. 8.

Schwarz, Heiko, et al., "Lagrangian Coder Control and Comparison of MPEG-4 and H.26L Video Codecs," ITG Fachberichte, Jan. 2002, pp. 301-308, No. 170, VDE Verlag, Berlin, DE.

Schwarz, Heiko, et. al., "An Improved H.26L Coder Using Lagrangian Coder Control," ITU Telecommunications Standardization Sector Study Group 16, Oct. 18, 2001, pp. 1-8, (whole document).

Segall, C. Andrew, et. al., "Pre- and Post-Processing Algorithms for Compressed Video Enhancement," Conference Record of the 34$^{th}$ Asilomar Conference on Signals, Systems, & Computers, Oct. 29, 2000, pp. 1369-1373, vol. 2 of 2, conf. 34, IEEE, United States.

Shen, Mei-Yin, et. al., "Fast Compression Artifact Reduction Technique Based on Nonlinear. Filtering," Proceedings of the 1999 IEEE International Symposium on Circuits and Systems. May 30, 1999, pp. 179-182, IEEE, United States.

Shen, Mei-Yin, et. al., "Real-Time Compression Artifact Reduction Via Robust Nonlinear Filtering," 1999 International Conference on Image Processing, Oct. 24, 1999, pp. 565-569, IEEE, United States.

Song, Hwangjun, et al., "Rate Control for Low-Bit-Rate Video via Variable-Encoding Frame Rates," IEEE Transactions on Circuits and Systems for Video Technology, Apr. 2001, pp. 512-521, vol. 11, No. 4.

Sullivan, Gary J., et al., "Rate-Distortion Optimization for Video Compression," IEEE Signal Processing Magazine, Nov. 1998, pp. 74-90, vol. 15, No. 6.

Tai, Pol-Lin, et al., "Computation-Aware Scheme for Software-Based Block Motion Estimation," IEEE Transactions on Circuits and Systems for Video Technology, Sep. 2003, pp. 901-913, vol. 13, No. 9.

Takagi, Koichi, et al., "A Study of a Rate Control Scheme for a JVT coder", Institute of Electronics, Information and Communication Engineers, Technical Report of IEICE, Nov. 2002, pp. 123-126 (English Abstract).

Tan, K.T., et al., "A Multi-Metric Objective Picture-Quality Measurement Model for MPEG Video," IEEE Transactions on Circuits and Systems for Video Technology, Oct. 2000, pp. 1208-1213, vol. 10, No. 7.

Tan, Soon Hie, et al., "Classified Perceptual Coding with Adaptive Quantization," IEEE Transactions on Circuits and Systems for Video Technology, Aug. 1996, pp. 375-388, vol. 6, No. 4.

Tourapis, Alexis M., et al., "Highly Efficient Predictive Zonal Algorithms for Fast Block-Matching Motion Estimation," IEEE Transactions on Circuits and Systems for Video Technology, Oct. 2002, pp. 934-947, vol. 12, No. 10.

Vetro, Anthony, et al., "MPEG-4 Rate Control for Multiple Video Objects," IEEE Transactions on Circuits and Systems for Video Technology, Feb. 1999, pp. 186-199, vol. 9, No. 1.

Wang, Limin, et al., "Bit Allocation and Constraints for Joint Coding of Multiple Video Programs," IEEE Transactions on Circuits and Systems for Video Technology, Sep. 1999, pp. 949-959, vol. 9, No. 6.

Wenger, Stephan, "H.264/AVC Over IP," IEEE Transactions on Circuits and Systems for Video Technology, Jul. 2003, pp. 645-656, vol. 13, No. 7.

Wiegand, Thomas, et al., "Rate-Constrained Coder Control and Comparison of Video Coding Standards," IEEE Transactions on Circuits and Systems for Video Technology, Jul. 2003, pp. 688-703, vol. 13, No. 7.

Wiegand, Thomas, et al., "Rate-Distortion Optimized Mode Selection for Very Low Bit Rate Video Coding and the Emerging H.263 Standard," IEEE Transactions on Circuits and Systems for Video Technology, Apr. 1996, pp. 182-190, vol. 6, No. 2.

Wiegand, Thomas, et. al., "Lagrange Multiplier Selection in Hybrid Video Coder Control," Proceedings 2001 International Conference on Image Processing, Oct. 7, 2001, pp. 542-545, vol. 1 of 3, conf. 8, IEEE, United States.

Yang, Seungjoon, et. al., "Blocking Effect Removal Using Regularization and Dithering," 1998 International Conference on Image Processing, Oct. 4, 1998, pp. 415-419, IEEE Comput. Soc., United States.

Yang, Yan, et al., "Rate Control for VBR Video Over ATM: Simplification and Implementation," IEEE Transactions on Circuits and Systems for Video Technology, Sep. 2001, pp. 1045-1058, vol. 11, No. 9.

Yang, Yan, et al., "Rate-Distortion Optimizations for Region and Object Based Wavelet Video Coding," Conference Record of the 34$^{th}$ Asilomar Conference on Signals, Systems & Computers, Oct. 29, 2000, pp. 1363-1368, vol. 2 of 2 Conf 34, IEEE, New York, United States.

Yu, Yue, et al., "A Novel Two-Pass VBR Coding Algorithm for Fixed-Size Storage Application," IEEE Transactions on Circuits and Systems for Video Technology, Mar. 2001, pp. 345-356, vol. 11, No. 3.

Zhu, Qin-Fan, et. al., "Image Reconstruction for Hybrid Video Coding Systems," Data Compression Conference, Mar. 24, 1992, pp. 229-238, IEEE Comput. Soc., United States.

Updated portions of prosecution history of EP05773224, Apr. 18, 2012 (mailing date), Apple Inc.

U.S. Appl. No. 13/437,931, filed Apr. 3, 2012, Tong, Xin, et al.

Updated portions of Prosecution History of U.S. Appl. No. 11/671,463, Feb. 2, 2011, Dumitras, Adriana, et al.

Updated portions of prosecution history of U.S. Appl. No. 11/118,616, Mar. 16, 2012, Tong, Xin, et al.

Updated portions of prosecution history of EP 04700631, Feb. 14, 2012, Apple Inc.

Updated portions of prosecution history of EP 08005958, Feb. 14, 2012, Apple Inc.

Joint Video Team (JVT) of ISO/IEC MPEG and ITU-T VCEG, "Working Draft No. 2, Revision 2 (WD-2)," Joint Video Team (JVT) of ISO/IEC MPEG and ITU-T VCEG, Jan. 29-Feb. 1, 2002, 106 pages, Geneva, Switzerland, JVT-B118r2.

* cited by examiner

METHOD AND APPARATUS FOR CONTROL OF RATE-DISTORTION TRADEOFF BY MODE SELECTION IN VIDEO ENCODERS

CLAIM OF BENEFIT TO PRIOR APPLICATIONS

This Application is a divisional application of U.S. patent application Ser. No. 11/344,591, entitled "Method and Apparatus for Control of Rate-Distortion Tradeoff by Mode Selection in Video Encoders", filed Jan. 30, 2006, now issued as U.S. Pat. No. 7,822,118. U.S. application Ser. No. 11/344,591 is a continuation of U.S. patent application Ser. No. 10/615,117 filed Jul. 7, 2003, now U.S. Pat. No. 7,042,943, entitled "Method and Apparatus for Control of Rate-Distortion Tradeoff by Mode Selection in Video Encoders", now issued as U.S. Pat. No. 7,042,943. U.S. patent application Ser. No. 10/615,117 claims the benefit of the previous U.S. Provisional Application entitled "Method and Apparatus for Control of Rate-Distortion Tradeoff by Mode Selection in Video Encoders," having Ser. No. 60/424,738 that was filed on Nov. 8, 2002. U.S. patent application Ser. No. 11/344,591, now issued as U.S. Pat. No. 7,822,118, and U.S. patent application Ser. No. 10/615,117, now issued as U.S. Pat. No. 7,042,943, are incorporated herein by reference.

FIELD OF THE INVENTION

The present invention relates to the field of multi-media compression and encoding systems. In particular the present invention discloses methods and systems for controlling the rate-distortion tradeoff in a digital video encoder.

BACKGROUND OF THE INVENTION

Digital based electronic media formats are completely replacing the legacy analog electronic media formats. In the audio domain, digital compact discs (CDs) replaced analog vinyl recordings many years ago. Analog magnetic cassette tapes are becoming increasingly rare. Second and third generation digital audio systems such as Mini-discs and MP3 (MPEG Audio-layer 3) based formats are now taking away market share from the first generation digital audio format of compact discs.

Film-based still photography is rapidly being replaced by digital still photography. Immediate image availability and image distribution via the Internet have provided users with irresistible features.

However, the video domain has been slower to move to digital storage and transmission formats than audio and still images. This has been largely due to the massive amounts of digital information required to accurately represent video in digital form. The massive amounts of digital information needed to accurately represent video require very high-capacity digital storage systems and high-bandwidth transmission systems.

But the video domain is finally adopting digital storage and transmission formats. Faster computer processors, high-density storage systems, high-bandwidth optical transmission lines, and new efficient video encoding algorithms have finally made digital video systems practical at consumer price points. The DVD (Digital Versatile Disc), a digital video system, has been one of the fastest selling consumer electronic products ever. DVDs have been rapidly supplanting Video-Cassette Recorders (VCRs) as the pre-recorded video playback system of choice due their exceptional video quality, high quality 5.1 channel digital audio, convenience, and extra features. In the realm of video transmission systems, the antiquated analog NTSC (National Television Standards Committee) video transmission standard is finally being replaced with the digital ATSC (Advanced Television Standards Committee) video transmission system that uses digital compression and encoding technology.

Computer systems have been using various different digital video encoding formats for a number of years. Among the best digital video compression and encoding systems used by computer systems have been the digital video systems backed by the Motion Pictures Expert Group commonly known by the acronym MPEG. The three most well known and highly used digital video formats from MPEG are known simply as MPEG-1, MPEG-2, and MPEG-4. Video CDs and consumer-grade digital video editing systems use the early MPEG-1 format. Digital Versatile Discs (DVDs) and the Dish Network brand Direct Broadcast Satellite (DBS) television broadcast system use the MPEG-2 digital video compression and encoding system. The MPEG-4 encoding system is rapidly being adapted by the latest computer based digital video encoders and associated digital video players.

The MPEG-2 and MPEG-4 standards compress a series of video frames or video fields and then encode the compressed frames or fields into a digital bitstream. The rate of the digital bitstream must be carefully monitored in order not to overflow memory buffers, underflow memory buffers, or exceed the transmission channel capacity. Thus, a sophisticated rate control system must be implemented with the digital video encoder that provides the best possible image quality in the allotted channel capacity without overflowing or underflowing buffers.

SUMMARY OF THE INVENTION

A Method And Apparatus For Control of Rate-Distortion Tradeoff by Mode Selection in Video Encoders is Disclosed. The system of the present invention first selects a distortion value D near a desired distortion value. Next, the system determines a quantizer value Q using the selected distortion value D. The system then calculates a Lagrange multiplier lambda using the quantizer value Q. Using the selected Lagrange multiplier lambda and quantizer value Q, the system begins encoding pixelblocks.

If the system detects a potential buffer overflow, then the system will increase the Lagrange multiplier lambda. The potential buffer overflow may be detected when a memory buffer occupancy value exceeds an overflow threshold value. If the Lagrange multiplier lambda exceeds a maximum lambda threshold then the system will increase the quantizer value Q.

If the system detects a potential buffer underflow, then the system will decrease the Lagrange multiplier lambda. The potential buffer underflow may be detected when a memory buffer occupancy value falls below a buffer underflow threshold value. If the Lagrange multiplier lambda falls below a minimum lambda threshold then the system will decrease the quantizer value Q.

Other objects, features, and advantages of the present invention will be apparent from the accompanying drawings and from the following detailed description.

BRIEF DESCRIPTION OF THE DRAWINGS

The objects, features, and advantages of the present invention will be apparent to one skilled in the art, in view of the following detailed description in which.

DETAILED DESCRIPTION OF THE PREFERRED EMBODIMENT

Modalities to control the rate-distortion tradeoff by mode selection in video encoders are disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to the MPEG-4 Part 10 (H.264) multimedia compression and encoding system. However, the same techniques can easily be applied to other types of compression and encoding systems.

Multimedia Compression and Encoding Overview

Figure 1:
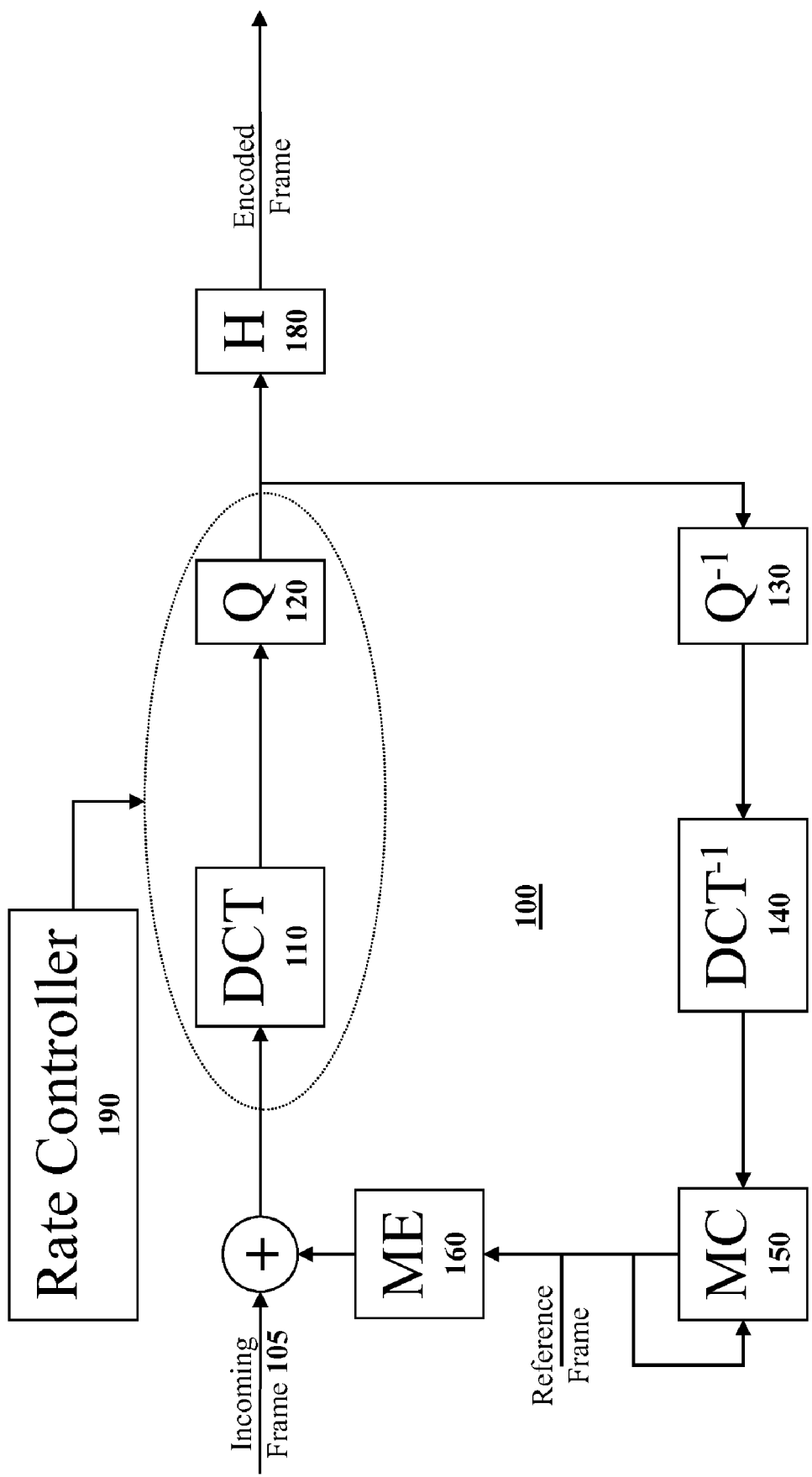
FIG. 1 illustrates a high-level block diagram of one possible digital video encoder system.

FIG. 1 illustrates a high-level block diagram of a typical digital video encoder 100 as is well known in the art. The digital video encoder 100 receives incoming video stream 105 at the left of the block diagram. Each video frame is processed by a Discrete Cosine Transformation (DCT) unit 110. The video frame may be processed independently (an intra-frame) or with reference to information from other frames (an inter-frame) using motion estimation unit 160. A Quantizer (Q) unit 120 then quantizes the information from the Discrete Cosine Transformation unit 110. The quantized frame is then encoded with an entropy encoder (H) unit 180 to produce an encoded video bitstream.

Since an inter-frame encoded video frame is defined with reference to other nearby video frames, the digital video encoder 100 needs to create a copy of exactly how a referenced digital video frame will appear within a digital video decoder such that inter-frames may be encoded. Thus, the lower portion of the digital video encoder 100 is actually a digital video decoder. Specifically, Inverse quantizer ($Q^{-1}$) 130 reverses the quantization of the frame information and inverse Discrete Cosine Transformation ($DCT^{-1}$) unit 140 reverses the Discrete Cosine Transformation of the video frame information. After all the DCT coefficients are reconstructed from inverse Discrete Cosine Transformation, the motion compensation unit will use the information, along with the motion vectors, to reconstruct the video frame which then may be used as a reference video frame for the motion estimation of other video frames.

The decoded video frame may be used to encode inter-frames that are defined relative to information in the decoded video frame. Specifically, a motion compensation (MC) unit 150 and a motion estimation (ME) unit 160 are used to determine motion vectors and generate differential values used to encode inter-frames.

A rate controller 190 receives information from many different components in a digital video encoder 100 and uses the information to allocate a bit budget for each video frame to be encoded. The bit budget should be assigned in a manner that will generate the highest quality digital video bit stream that complies with a specified set of restrictions. Specifically, the rate controller 190 attempts to generate the highest quality of a compressed video stream without overflowing memory buffers (exceeding the amount of available buffer memory by sending video frame information much faster than the video frame information is displayed and subsequently deleted) or underflowing memory buffers (not sending video frame information fast enough such that a receiving digital video decoder runs out of video frame information to display).

Pixelblock Encoding

Many digital video coding algorithms first partition each video picture into small subsets of pixels that are generally referred to as pixelblocks. Specifically, the video picture is divided into a grid of rectangular pixelblocks. The terms Macroblock, block, sub-block are also commonly used for subsets of pixels. This document will use the term pixelblock to include all of these different but similar constructs. Different sized pixelblocks may be used by different digital video encoding systems. For example, different pixelblock sizes used include 8 pixel by 8 pixel pixelblocks, 8 pixel by 4 pixel pixelblocks, 16 pixel by 16 pixel pixelblocks, 4 pixel by 4 pixel pixelblocks, etc.

To encode a video picture, each individual pixelblock of the video picture is encoded using some sort of encoding method. Some pixelblocks known as intra-blocks are encoded without reference to any other pixelblocks. Other pixelblocks are encoded using some predictive coding method such as motion compensation that refers to a closely matching pixelblock in the same or a different video picture.

Each individual pixelblock in a video picture is independently compressed and encoded. Some video coding standards, e.g., ISO MPEG or ITU H.264, use different types of predicted pixelblocks to encode digital video pictures. In one scenario, a pixelblock may be one of three types:

1. I-pixelblock—An Intra (I) pixelblock uses no information from any other video pictures in its coding (thus, an intra-pixelblock is completely self-defined);
2. P-pixelblock—A unidirectionally Predicted (P) pixelblock refers to picture information from an earlier video picture; or
3. B-pixelblock—A Bi-directional predicted (B) pixelblock uses information from both an earlier video picture and a later future video picture.

If all of the pixelblocks in an encoded digital video picture are Intra-pixelblocks (I-pixelblocks) then the encoded digital video picture frame is known as an Intra-frame. Note that an Intra-frame makes no reference to any other video picture such that the Intra-frame digital video picture is completely self-defined.

If a digital video picture frame only includes unidirectional predicted pixelblocks (P-pixelblocks) and intra-pixelblocks (I-pixelblocks) but no bi-directional predicted pixelblocks (B-pixelblocks), then the video picture frame is known as a P-frame. I-pixelblocks may appear in P-frames when using predictive encoding (P-pixelblock encoding) and require more bits than an independently encoded pixelblock (an I-pixelblock).

If a digital video picture frame contains any bi-directional predicted pixelblocks (B-pixelblocks), then the video picture frame is known as a B-frame. For simplicity, this document will consider the case where all pixelblocks within a given picture are of the same type. (Intra-frames only contain I-pixelblocks, P-frames only contain P-pixelblocks, and B-frames only contain B-pixelblocks.)

An example sequence of video pictures to be encoded might be represented as:

$I_1 B_2 B_3 B_4 P_5 B_6 B_7 B_8 B_9 P_{10} B_{11} P_{12} B_{13} I_{14} \ldots$ where the letter (I, P, or B) represents if the digital video picture frame is an I-frame, P-frame, or B-frame and the numerical subscript represents the camera order of the video picture in the sequence of video pictures. The camera order is the order in which a camera recorded the video pictures and thus is also the order in which the video pictures should be displayed (the display order).

Figure 2:
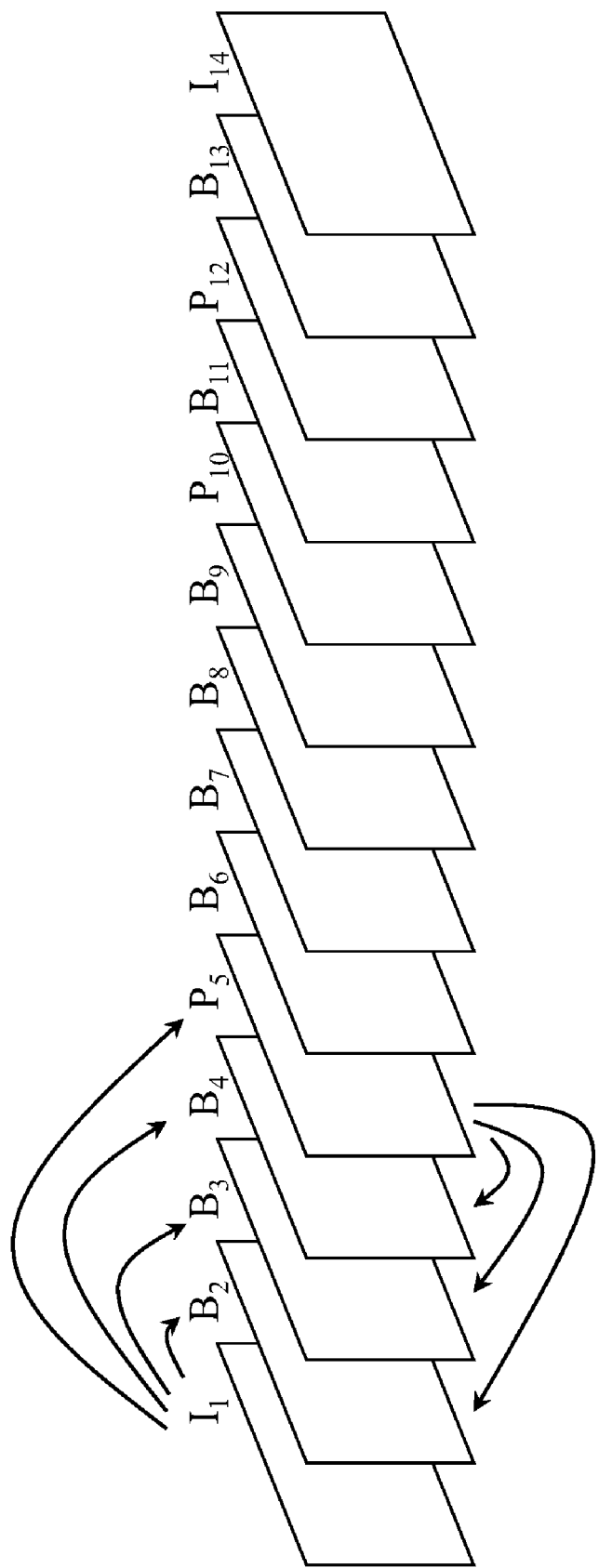
FIG. 2 illustrates a series of video pictures in the order that the pictures should be displayed wherein the arrows connecting different pictures indicate inter-picture dependency created using motion compensation.

The preceding example series of video pictures is conceptually illustrated in FIG. 2. Referring to FIG. 2, the arrows indicate that pixelblocks from a stored picture (I-frame or P-frame in this case) are used in the motion compensated prediction of other digital video pictures (B-frames and P-frames).

Referring to FIG. 2, no information from any other video picture is used in the encoding of the first video picture frame, intra-frame video picture I. Video picture $P_5$ is a P-frame that uses video information from previous video picture $I_1$ in its encoding such that an arrow is drawn from intra-frame video picture $I_1$ to P-frame video picture $P_5$. Video picture $B_2$, video picture $B_3$, and video picture $B_4$ all use information from both video picture $I_1$ and video picture $P_5$ in their encoding such that information dependency arrows are drawn from video picture $I_1$ and video picture $P_5$ to video picture $B_2$, video picture $B_3$, and video picture $B_4$.

Since B-frame video pictures use information from later video pictures (pictures that will be displayed later), the transmission order of a set of digital video pictures is usually different than the display order of the digital video pictures. Specifically, referenced video pictures that are needed to construct other video pictures should be transmitted before the video pictures that are dependent upon referenced video pictures. Thus, for the display order of FIG. 2, the preferred transmission order might be:

$I_1 P_5 B_2 B_3 B_4 P_{10} B_6 B_7 B_8 B_9 P_{12} B_{11} I_{14} B_{13} \ldots$

Figure 3:
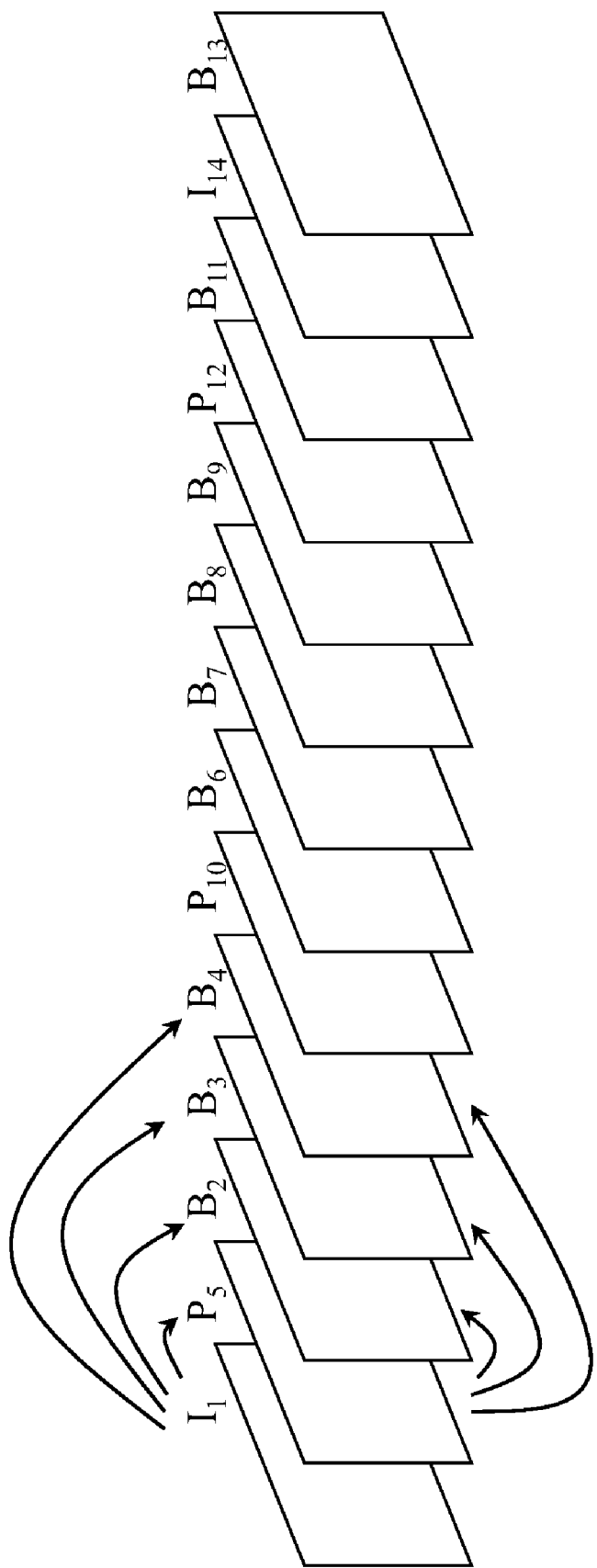
FIG. 3 illustrates the series of video pictures from FIG. 2 rearranged into a preferred transmission order of video pictures wherein the arrows connecting different pictures indicate inter-picture dependency created using motion compensation.

FIG. 3 graphically illustrates this preferred transmission order of the video pictures from FIG. 2. Again, the arrows in the figure indicate that pixelblocks from a referenced video picture (an I-frame or P-frame video picture in this case) are used in the motion compensated prediction of other video pictures (P-frame and B-frame video pictures).

Referring to FIG. 3, the transmitting system first transmits I-frame which does not depend on any other video frame. Next, the system transmits P-frame video picture $P_5$ that depends only upon previously transmitted video picture $I_1$. Next, the system transmits B-frame video picture $B_2$ after video picture $P_5$ even though video picture $B_2$ will be displayed before video picture $P_5$. The reason for this is that when it comes time to decode and render dependent video picture $B_2$, the digital video decoder will have already received and decoded the information in video picture $I_1$ and video picture $P_5$ necessary to decode dependent video picture $B_2$. Similarly, decoded video picture $I_1$ and decoded video picture $P_5$ are ready to be used to decode and render the next two dependent video pictures: dependent video picture $B_3$ and dependent video picture $B_4$.

The receiver/decoder system then reorders the video picture sequence for proper display. In this operation, referenced video picture $I_1$ and referenced video picture $P_5$ are referred to as "stored pictures." Stored pictures are used to reconstruct other dependent video pictures that refer to the stored pictures. (Note that some digital video encoding systems also allow B-frames to be used as stored pictures.)

P-Pictures

The encoding of P-Pictures typically utilizes Motion Compensation (MC), wherein a Motion Vector (MV) pointing to a location in a previous video picture is computed for each pixelblock in the current video picture. The Motion Vector refers to a closely matching pixelblock in a referenced video picture. Using the motion vector, a prediction pixelblock can be formed by translation of referenced pixels in the aforementioned previous video picture. The difference between the actual pixelblock in the P-Picture and the prediction pixelblock is then coded for transmission. This difference is then used to accurately reconstruct the original pixelblock.

Each motion vector may also be transmitted via a predictive encoding method. For example, a motion vector prediction may be formed using nearby motion vectors. In such a case, the difference between the actual motion vector and a predicted motion vector is then coded for transmission. The difference is then used to create the actual motion vector from the predicted motion vector.

B-Pictures

Each B-pixelblock in a B-frame uses two different motion vectors: a first motion vector that references a pixelblock in an earlier video picture and a second motion vector that references another pixelblock in a later video picture. From these two motion vectors, two prediction pixelblocks are computed. The two predicted pixelblocks are then combined together, using some function, to form a final predicted pixelblock. (The two predicted pixelblocks may simply be averaged together.) As with P-pixelblocks, the difference between the actual desired pixelblock for the B-frame picture and the final predicted pixelblock is then encoded for transmission. The pixelblock difference will then be used to accurately reconstruct the original desired pixelblock.

As with P-pixelblocks, each motion vector (MV) of a B-pixelblock may also be transmitted via a predictive encoding method. Specifically, a predicted motion vector may be formed using some combination of nearby motion vectors. Then, the difference between the actual motion vector and the predicted is encoded for transmission. The difference is then used to recreate the actual motion vector from the predicted motion vector.

However, with B-pixelblocks the opportunity exists for interpolating motion vectors from motion vectors in the collocated or nearby stored picture pixelblock. Such motion vector interpolation is carried out both in the digital video encoder and the digital video decoder. (Remember that a digital video encoder always includes a digital video decoder.)

In some cases, the interpolated motion vector is good enough to be used without any type of correction to the interpolated motion vector. In such cases, no motion vector data need be sent. This is referred to as 'Direct Mode' in the ITU H.263 and H.264 digital video encoding standards.

The technique of motion vector interpolation works particularly well on a series of digital video pictures from a video sequence created by a camera that is slowly panning across a stationary background. In fact, such motion vector interpolation may be good enough to be used alone. Specifically, this means that no differential motion vector information needs be calculated or transmitted for these B-pixelblock motion vectors encoded using such motion vector interpolation.

Pixelblock Encoding

Within each video picture the pixelblocks may also be coded in different manners. For example, a pixelblock may be divided into smaller subblocks, with motion vectors computed and transmitted for each subblock. The shape of the subblocks may also vary and may not necessarily be square.

Within a P-picture or B-picture, some pixelblocks may be more efficiently encoded without using motion compensation if no closely matching pixelblock can be found in the stored reference picture. Such pixelblocks would then be coded as Intra-pixelblocks (I-pixelblocks). Within a B-picture, some pixelblocks may be better coded using unidirectional motion compensation instead of bi-directional motion compensation. Thus, those pixelblocks would be coded as forward predicted pixelblocks (P-pixelblocks) or backward predicted pixelblocks depending on whether the closest matching pixelblock was found in an earlier video picture or a later video picture.

Prior to transmission, the prediction error of a pixelblock or subblock is typically transformed by an orthogonal transform such as the Discrete Cosine Transform or an approximation thereto. The result of the transform operation is a set of transform coefficients equal in number to the number of pixels in the pixelblock or subblock being transformed. At the receiver/decoder, the received transform coefficients are inverse transformed to recover the prediction error values to be used further in the decoding. Not all the transform coefficients need be transmitted for acceptable video quality. Depending on the transmission bit-rate available, more than half or sometimes much more than half of the transform coefficients may be deleted and not transmitted. At the decoder the deleted coefficient values are replaced by zero values prior to inverse transform operation.

Furthermore, prior to transmission the transform coefficients are typically Quantized and Entropy Coded as set forth with reference to FIG. 1. Quantization involves representation of the transform coefficient values by a finite subset of possible values, which reduces the accuracy of transmission. Furthermore, the quantization often forces small transform coefficient values to zero, thus further reducing the number of transform coefficients values that are transmitted.

In the quantization step, each transform coefficient value is typically divided by a quantizer step size Q and rounded to the nearest integer. For example, the original transform coefficient C may be quantized into the quantized coefficient value Cq using the formula:

$$Cq=(C+Q/2)/Q \text{ truncated to an integer.}$$

After the quantization step, the integers are then entropy coded using variable length codes (VLC) such as Huffman codes or Arithmetic codes. Since many transform coefficient values will be truncated to zero, a good amount of compression will be achieved from the quantization and variable length coding steps.

Using a Lagrange Function to Select Bit Rate and Distortion Values

A digital video encoder must determine the best encoding method amongst all of the possible encoding methods (or encoding modes) that will be used to encode each pixelblock in a video picture. This encoding problem is commonly known as the mode selection problem. Many ad hoc solutions have been used in various digital video encoder implementations to address the mode selection problem. The combination of the transform coefficient deletion, the quantization of the transform coefficients that are transmitted, and the mode selection leads to a reduction of the bit rate R used for transmission. However, these bit rate R reduction techniques also lead to a distortion D in the decoded video pictures.

Ideally, when designing a video encoder one would like to either fix the bit rate R to a constant value and minimize the coding distortion D or fix the coding distortion D to a constant value while minimizing the bit rate R. However, especially, at the pixelblock level, the bit rate R and/or the distortion D value may vary considerably from the desired fixed value, thus making the constrained optimization approach untenable.

Instead what may be done is to use a Lagrange multiplier to convert the constrained optimization problem into an unconstrained optimization problem. Thus, instead of fixing one of the variables (bit rate R or the distortion D) and optimizing the other variable, one may instead simply minimize the Lagrange function:

$$D+\text{lambda}\times R$$

where lambda is the Lagrange multiplier. Thus, for each pixelblock in a video picture, the encoder selects the pixelblock encoding mode that minimizes the Lagrange function $D+\text{lambda}\times R$.

In theory, a full optimization for each individual video picture would be carried out by repeatedly using all possible values of lambda, with each lambda producing a {D,R} pair. From this, for a desired bit rate R (or distortion D), the corresponding distortion D (or bit rate R) and lambda value can be found. Then the video picture would be finally encoded again using this selected lambda value, which would produce the desired result.

In practice, this ideal approach is usually too complicated and too resource intensive to perform for every video picture. What is usually done is to carry out many preliminary experiments with many video pictures using the complete optimization method above with a wide range of lambdas in order to determine approximate relationships between lambda, distortion D, and quantizer Q.

Figure 4:
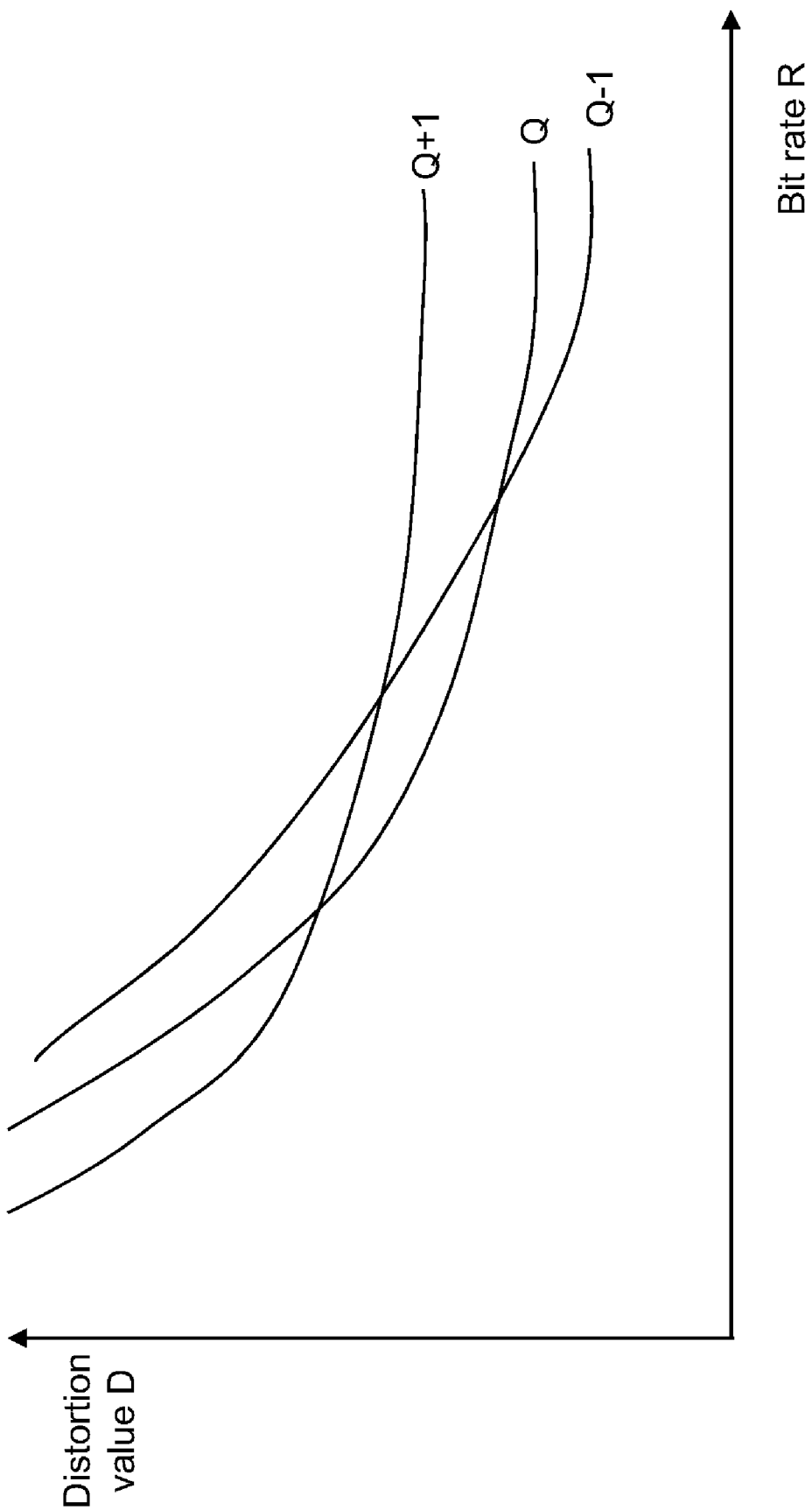
FIG. 4 graphically illustrates a family of R,D curves, with one curve for each different value of quantizer Q.

Preliminary experiments with a large number of video pictures using the complete optimization method with a wide range of lambdas determine approximate relationships between lambda, distortion D, and quantizer Q. In these experiments it is often advantageous to hold the quantizer Q constant while varying the lambda Lagrange multiplier. If quantizer Q is held constant during each experiment, the end result is a family of R,D curves, with one curve for each different value of quantizer Q. FIG. 4 illustrates one example of such a family of R,D curves. For each different constant Q curve, at a particular {R,D} point obtained with a certain value of lambda the slope of the curve is (−lambda). The optimum {R,D} relationship is obtained by taking the minimum of all the R,D curves.

Following this, for each different quantizer Q value, a representative lambda value is chosen such as $\text{lambda}_Q$. For example, $\text{lambda}_Q$ might be the value that provides a distortion D value half-way between the crossover points for Q+1 and Q−1 in FIG. 4. Other methods that have been used to select a representative lambda value include $\text{lambda}_Q=0.85Q^2$ and $\text{lambda}_Q=0.85\times 2^{Q/3}$. For multiple B-pictures, much larger $\text{lambda}_Q$ values are often chosen. Thus, we have $$\text{lambda}_Q=f(Q)$$

$$D_Q=g(Q) \text{ from which one can obtain } Q=h(D_Q)$$

Then to encode a video picture sequence with a desired distortion D, one may first find the nearest $D_Q$ from which one obtains $Q=h(D_Q)$. Then the video picture encoding is performed using the corresponding $\text{lambda}_Q=f(Q)$, which provides the optimum bit rate R for the distortion $D_Q$.

In many applications, the resulting bit rate R may be too large or too small necessitating the use of rate control to ensure that no buffer overflow or buffer underflow occurs. With most rate control algorithms, the usual method is to vary the quantizer Q from pixelblock to pixelblock and/or from video picture to video picture. When the encoder buffer threatens to get too full (and possibly overflow) the value of the quantizer Q is increased in order to reduce the bit rate R. When the encoder buffer is too empty (and will possibly underflow), the quantizer Q is reduced in order to increase the bit rate R.

However, the changing of the quantizer Q value may result in too large of a change in the bit rate R. Furthermore, changes in the Quantizer Q need to be signaled to the decoder, which adds to the amount of overhead bits that must be transmitted to the decoder. Moreover, changing Quantizer Q may have other effects relating to video picture quality, such as loop filtering.

An alternative to changing the quantizer Q is to change the Lagrange multiplier lambda in order to achieve the desired rate control. A smaller value of the Lagrange multiplier lambda results in a larger bit rate R (and smaller distortion D), and similarly a larger value of the Lagrange multiplier lambda decreases the bit rate R (and increases distortion D). The variation in the Lagrange multiplier lambda can be arbitrarily fine, as opposed to changes in the quantizer Q that is digitized and encoded such that the quantizer Q is limited to only certain values. In many digital video compression and encoding systems, including all of the MPEG video compression and encoding standards, not all integer values of the quantizer Q are allowed to be sent, in which case the abrupt change in bit rate R may be even more pronounced.

When the Lagrange multiplier lambda is required to be larger than a certain threshold Lambda_max(Q) to achieve a certain bit rate reduction, then the quantizer Q would be increased and the Lagrange multiplier lambda would return to its nominal value f(Q) using the newly increased quantizer Q value. When the Lagrange multiplier lambda is required to be smaller than a certain threshold Lambda_min(Q) to achieve a certain bit rate increase, then the quantizer Q would be decreased and the Lagrange multiplier lambda would return to its nominal value f(Q) using the newly decreased quantizer Q.

The values of Lambda_max(Q) and Lambda_min(Q) are determined by the crossover points on the bit rate-distortion relationship illustrated in FIG. 4. If one defines D(lambda,Q) to be the distortion achieved when encoding with the Lagrange multiplier lambda and quantizer step size Q, then the operative relationships are D( Lambda_min(Q+1), Q+1 ) = D( Lambda_max(Q), Q )
Lambda_min(Q) <= f(Q) <= Lambda_max(Q)

The detailed operation of such a rate control algorithm for a video encoding system is set forth in the following pseudo code:

```
Start_encoding_picture:              // Begin encoding a video picture
    input desired D;                 // Get the desired Distortion D value
    find D_Q nearest to D;           // Find the D_Q value closest to the desired D
    Q = h(D_Q);                      // Determine the quantizer value Q
    lambda = f(Q);                   // Determine the Lagrange multiplier lambda
start_encoding_pixelblock:           // Begin encoding a pixelblock from the picture
    code_pixelblock(lambda,Q);       //Encode pixelblock using lambda and Q
    if (encoder_buffer > Tfull){     // Buffer threatens to overflow?
        lambda = lambda+deltalambda; // deltalambda may depend on Q
        if (lambda > Lambda_max(Q) ){ // if lambda too large, increase Q
            Q = Q+deltaQ;            // Increase the Quantizer Q size
            lambda = f(Q);           // Set new Lagrange multiplier lambda
        }
    }
    if (encoder_buffer < Tempty){    // Buffer threatens to underflow?
        lambda=lambda-deltalambda;   // Yes, so decrease lambda
        if (lambda < Lambda_min(Q) ){ // if lambda too small, decrease Q
            Q = Q-deltaQ;            // Decrease Quantizer Q size
            lambda = f(Q);           // Set new Lagrange multiplier lambda
        }
    }
    if (not last pixelblock) then goto start_encoding_pixelblock;    //Next block
// Done with picture.
```

Variations on this general rate control algorithm could include multiple different thresholds for the encoder_buffer value, whereby if encoder_buffer greatly exceeded the Tfull threshold then Quantizer Q could be incremented immediately without waiting for the Lagrange multiplier lambda to exceed its threshold. Similarly, if encoder buffer was significantly below the Tempty threshold then the Quantizer Q could be decremented immediately. Alternatively, the delta-lambda step size could be increased if encoder buffer greatly exceeded the Tfull threshold or greatly undershot the Tempty threshold.

The values of deltalambda and deltaQ might vary with the quantizer Q or with video picture type (I-picture, P-picture, or B-picture). Furthermore, the increment operation on the Lagrange multiplier lambda might be replaced by a multiplication that could change the Lagrange multiplier lambda by a certain percentage amount. For example, the Lagrange multiplier lambda may be changed using the following equation for a lambda increase operation:

lambda=(1+deltalambda)×lambda

Similarly, for the lambda decrement operation the following equation may be used lambda=(1−deltalambda)×lambda This simple rate control algorithm illustrates the use of varying lambda for this application. Other more complicated rate control algorithms have also been devised, and those other rate control algorithms too could benefit from varying the Lagrange multiplier lambda.

Visual Distortion Tradeoff

Another application for varying the Lagrange multiplier lambda is in the use of visual distortion criteria. The distortion D is often measured by summing the squared difference between the original pixel values and the decoded pixel values. However, this simple distortion measurement method is not well tuned to the actual visibility of pixel errors in a video picture. Thus, such a simple distortion measurement method may cause the preceding minimizations to provide less than optimal results. Thus, an algorithm that takes subjective effects into account is often more useful.

The visibility of encoding noise may be taken into account by calculating a visual mask value M for each pixelblock or subblock that will be encoded in the video picture. The visual mask value M is based on spatial variations and temporal variations of the pixels within the region.

A larger value of visual mask M indicates greater masking that makes the distortion more difficult to visually detect. In such regions, the distortion D can be increased and the bit rate R reduced. This is conveniently accomplished by using M×lambda (the Lagrange multiplier) in the encoding optimization algorithm instead of the Lagrange multiplier lambda alone. The following pseudo code sets forth the modified algorithm:

```
Start_encoding_picture:           // Begin encoding a video picture
    input desired D;              // Get the desired Distortion D value
    find D_Q nearest to D;        // Find the D value closes to the desired D
    Qnorm = h(D_Q);               // Determine normal Q with no masking
    lambda = f(Qnorm);            // Determine the Lagrange multiplier lambda
start_encoding_pixelblock :       // Begin encoding a pixelblock from the picture
    Q = Qnorm;                    // Set Q to the normal Q with no masking
    calculate visual mask M;      // Determine the visual masking amount
    while(M×lambda > Lambda_max(Q) ){   // if strong masking, increase Q
        Q = Q+deltaQ;             // Raise the Quantizer Q size
    }
    code pixelblock( M×lambda, Q );   // Encode using M×lambda and Q
    if (encoder_buffer > Tfull){  // If buffer threatens to fill overflow
        lambda = lambda+deltalambda;   // Increase lambda
        if ( lambda > Lambda_max(Qnorm) ){   // Test lambda
            Qnorm=Qnorm+deltaQ;   //Increase Q size if lambda too big
            lambda = f(Qnorm);    // Calculate new lambda
        }
    }
    if (encoder_buffer < Tempty){ // If buffer threatens to fill underflow
        lambda = lambda-deltalambda;   // Decrease lambda
        if ( lambda < Lambda_min(Qnorm) ){   // Test lambda
            Qnorm = Qnorm-deltaQ; // Decrease Q if lambda too small
            lambda = f(Qnorm);    // Calculate new lambda
        }
    }
    if ( not last pixelblock) then goto start_encoding_pixelblock    //Next
// Done with picture.
```

This second simple visual masking algorithm illustrates the use of varying lambda for this application. Other more complicated visual masking algorithms have also been devised, and those visual masking algorithms could also benefit from varying lambda.

Variation of the Lagrange multiplier lambda may also be useful in other encoding decisions. For example, the determination of how many B-pictures to encode when encoding a series of video pictures is often very difficult to answer. For a particular value of quantizer Q and $lambda_Q=f(Q)$, the result of encoding with one B-picture per P-picture might be $R_1, D_1$ whereas the result of encoding with two B-pictures per P picture might be $R_2, D_2$.

If $R_2 < R_1$ and $D_2 < D_1$ then it is clear that the best answer is that two B-pictures are better. However, very often the result is $R_2 < R_1$ and $D_2 > D_1$ such that it is not clear that a number of B-pictures is better. In this case we can recode using two-B pictures per P picture with a smaller lambda that gives $D_2$ approximately equal to $D_1$. Then we simply compare the resulting values of $R_2$ and $R_1$ to see which bit rate is smaller.

Other scenarios may be similarly compared, e.g., interlace vs. progressive coding, coding with various motion search ranges, encoding with or without certain encoding modes, etc.

In conclusion, we present a simple but powerful method of rate-distortion tradeoff that has many applications in video coding. The foregoing has described a system for control of rate-distortion tradeoff by encoding mode selection in a multi-media compression and encoding system. It is contemplated that changes and modifications may be made by one of ordinary skill in the art, to the materials and arrangements of elements of the present invention without departing from the scope of the invention.

We claim:

1. An encoder comprising:
    a quantizer unit for quantizing at least one video picture; and
    a rate controller (i) to calculate a Lagrange multiplier value using a quantizer value that is used by the quantizer unit, (ii) to change the Lagrange multiplier value by a Lagrange multiplier delta value when changing the Lagrange multiplier value by the Lagrange multiplier delta value would result in a Lagrange multiplier value that satisfies a Lagrange multiplier threshold value, and (iii) to change the quantizer value by a quantizer delta value when changing the Lagrange multiplier value by the Lagrange multiplier delta value would result in a Lagrange multiplier value that does not satisfy the Lagrange multiplier threshold value.

2. The encoder of claim 1, wherein the rate controller changes the Lagrange multiplier value and the quantizer value to achieve a particular distortion value that is closest to a desired distortion value.

3. The encoder of claim 1 further comprising a buffer that stores video pictures.

4. The encoder of claim 3, wherein the rate controller increases the Lagrange multiplier delta value when the buffer is above an overflow threshold value.

5. The encoder of claim 3, wherein the rate controller increases the Lagrange multiplier delta value when the buffer is below an underflow threshold value.

6. The encoder of claim 1, wherein the rate controller changes the quantizer value when a buffer that stores video pictures is above an overflow threshold value or below an underflow threshold value.

7. The encoder of claim 1, wherein the rate controller changes the quantizer value when changing the Lagrange multiplier value by the Lagrange multiplier delta value would result in a Lagrange multiplier value that is above a maximum Lagrange multiplier threshold value or below a minimum Lagrange multiplier threshold value.

8. The encoder of claim 1, wherein the rate controller determines the quantizer delta value based on a type of the video picture, wherein the type of the video picture is one of an I-picture, a P-picture, and a B-picture.

9. The encoder of claim 1, wherein the rate controller determines the Lagrange multiplier delta value based on a type of the video picture, wherein the type of the video picture is one of an I-picture, a P-picture, and a B-picture.

10. The encoder of claim 1, wherein the rate controller determines the Lagrange multiplier delta value based on the quantizer value.

11. The encoder of claim 1, wherein the rate controller changes the Lagrange multiplier value when a buffer that stores video pictures is above an overflow threshold value or below an underflow threshold value.

12. A method for controlling bit rate for encoding a sequence of video pictures, each video picture comprising a set of pixelblocks, the method comprising:

calculating a Lagrange multiplier value using a quantizer value;

encoding a pixelblock using the Lagrange multiplier value and the quantizer value;

changing the Lagrange multiplier value by a Lagrange multiplier delta value when changing the Lagrange multiplier value by the Lagrange multiplier delta value would result in a Lagrange multiplier value that satisfies a Lagrange multiplier threshold value; and changing the quantizer value by a quantizer delta value when changing the Lagrange multiplier value by the Lagrange multiplier delta value would result in a Lagrange multiplier value that does not satisfy the Lagrange multiplier threshold value.

13. The method of claim 12 further comprising increasing the Lagrange multiplier delta value when a buffer that stores video pictures is above an overflow threshold value.

14. The method of claim 12 further comprising increasing the Lagrange multiplier delta value when a buffer that stores video pictures is below an underflow threshold value.

15. The method of claim 12 further comprising changing the quantizer value when a buffer that stores video pictures is above an overflow threshold value or below an underflow threshold value.

16. The method of claim 12 further comprising determining the quantizer delta value based on a type of the video picture, wherein the type of the video picture is one of an I-picture, a P-picture, and a B-picture.

17. The method of claim 12 further comprising determining the quantizer delta value based on the quantizer value.

18. The method of claim 12 further comprising determining the Lagrange multiplier delta value based on a type of the video picture, wherein the type of the video picture is one of an I-picture, a P-picture, and a B-picture.

19. The method of claim 12 further comprising determining the Lagrange multiplier delta value based on the quantizer value.

20. The method of claim 12 further comprising changing the Lagrange multiplier value when a buffer that stores video pictures is above an overflow threshold value or below an underflow threshold value.

* * * * *